(12) United States Patent
Ohki

(10) Patent No.: US 11,061,413 B2
(45) Date of Patent: Jul. 13, 2021

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Mitsuharu Ohki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/752,905

(22) PCT Filed: Jun. 20, 2017

(86) PCT No.: PCT/JP2017/022677
§ 371 (c)(1),
(2) Date: Feb. 15, 2018

(87) PCT Pub. No.: WO2018/008388
PCT Pub. Date: Jan. 11, 2018

(65) Prior Publication Data
US 2019/0113921 A1    Apr. 18, 2019

(30) Foreign Application Priority Data

Jul. 4, 2016    (JP) .............................. JP2016-132249

(51) Int. Cl.
*G05D 1/10* (2006.01)
*G01S 17/89* (2020.01)
(Continued)

(52) U.S. Cl.
CPC ............. *G05D 1/101* (2013.01); *B64C 13/18* (2013.01); *B64C 39/02* (2013.01); *B64C 39/024* (2013.01);
(Continued)

(58) Field of Classification Search
CPC .. G05D 1/0094; G05D 1/0016; G05D 1/0033; G05D 1/101; G01S 3/784;
(Continued)

(56) References Cited

U.S. PATENT DOCUMENTS

| 6,515,737 B2* | 2/2003 | Perry | ...................... F41G 7/263 |
|---|---|---|---|
| | | | 348/144 |
| 2002/0005942 A1* | 1/2002 | Perry | ...................... F41G 7/263 |
| | | | 356/5.04 |

FOREIGN PATENT DOCUMENTS

| JP | 62-175683 A | 8/1987 |
|---|---|---|
| JP | 2002-139299 A | 5/2002 |

(Continued)

OTHER PUBLICATIONS

Monnin, Et al., "A 3D Outdoor Scene Scanner Based on a Night-Vision Range-Gated Active Imaging System", Proceedings of the Third International Symposium on 3D Data Processing, Visualization, and Transmission. The Computer Society, 2006. (Year: 2006).*

(Continued)

*Primary Examiner* — Maceeh Anwari
(74) *Attorney, Agent, or Firm* — Chip Law Group

(57) ABSTRACT

The present disclosure relates to an information processing apparatus and an information processing method that make it possible to appropriately guide a flying object to a target object even in a case where a translucent substance such as fog exists. In a first period, a gated image of a target object is captured, and in a second period, a user handles a guidance control device for projecting a spotlight, in the same direction as an image capturing direction for capturing the gated image, by changing a distance and a direction, in order to bring the target object into a state in which the target object can be captured as the gated image, and then a laser pointer is projected on the target object. Thus, a flying object is guided toward reflected light that is the light of the laser (Continued)

pointer reflected by the target object, and thereby the flying object can be appropriately guided to the target object even in a case where a translucent substance such as fog exists. The present disclosure can be applied to a guided flying object such as a drone.

6 Claims, 14 Drawing Sheets

(51) Int. Cl.
  *G01S 3/784*  (2006.01)
  *B64C 39/02*  (2006.01)
  *B64C 13/18*  (2006.01)
  *G05D 1/00*  (2006.01)

(52) U.S. Cl.
  CPC .............. *G01S 3/784* (2013.01); *G01S 17/89* (2013.01); *G05D 1/0016* (2013.01); *G05D 1/0033* (2013.01); *G05D 1/0094* (2013.01); *B64C 2201/141* (2013.01)

(58) Field of Classification Search
  CPC ....... G01S 17/89; G01S 17/107; B64C 39/02; B64C 13/18; B64C 39/024; B64C 2201/141; B64C 2201/14

USPC .......................................................... 701/11
See application file for complete search history.

(56) References Cited

FOREIGN PATENT DOCUMENTS

| JP | 2005-090846 A | | 4/2005 |
|---|---|---|---|
| JP | 2007-003079 A | | 1/2007 |
| JP | 2010-071593 A | | 4/2010 |
| JP | 201071593 A | * | 4/2010 |

OTHER PUBLICATIONS

International Search Report and Written Opinion of PCT Application No. PCT/JP2017/022677, dated Sep. 12, 2017, 09 pages.
Monnin, et al., "A 3D Outdoor Scene Scanner Based on a Night-Vision Range-Gated Active Imaging System", Proceedings of the Third International Symposium on 3D Data Processing, Visualization, and Transmission (3DPVT'06), 0-7695-2825-2/06, The Computer Society, 2006, 08 pages.

* cited by examiner

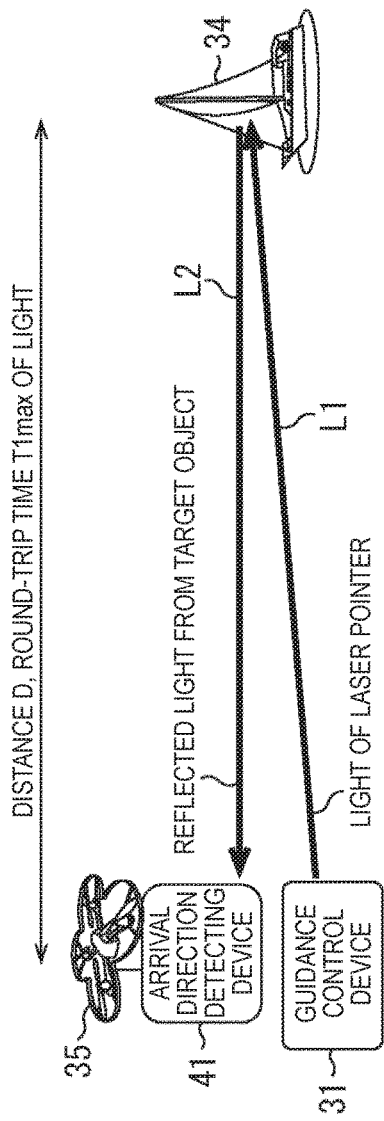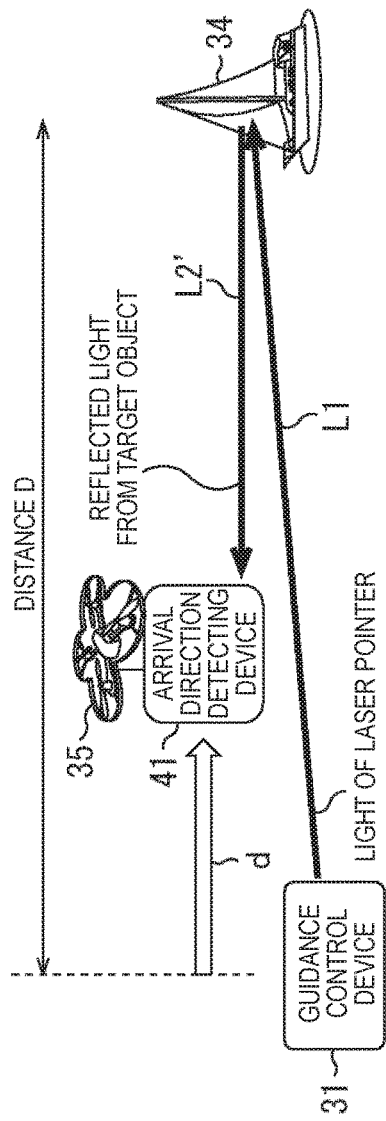

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/022677 filed on Jun. 20, 2017, which claims priority benefit of Japanese Patent Application No. JP 2016-132249 filed in the Japan Patent Office on Jul. 4, 2016. Each of the above-referenced applications is hereby incorporated herein by reference in its entirety.

TECHNICAL FIELD

The present disclosure relates to an information processing apparatus and an information processing method, and particularly to an information processing apparatus and an information processing method for guiding a flying object appropriately even in a case where a translucent substance such as fog exists, by means of a combination of gated imaging and a laser pointer or the like for indicating a direction of the gated imaging.

BACKGROUND ART

There is a proposed imaging technique, which is known by names such as active gated imaging, active imaging, or range-gated active imaging and is called gated imaging in Japan, for sharply imaging only an imaged object at a specific distance by emitting pulse light and capturing an image by an image sensor only during a predetermined period in which the pulse light arrives and illuminates (see Non-Patent Literature 1).

Also, there is a proposed technology in which a pinpoint light (light of a laser pointer or the like) is projected on a target object to guide a flying object, and the flying object detects the direction of the pinpoint light reflected from the target object and flies toward the detected direction to fly to the target object (see Patent Literature 1).

Note that as a device for knowing the intensity and direction of light, HARLID (High Angular Resolution Laser Irradiance Detector) (trademark) which is a product of Excelitas Technologies Corporation is known for example.

CITATION LIST

Non-Patent Literature

Non-Patent Literature 1: David Monnin, Armin L. Schneider, Frank Christnacher, Yves Lutz, "A 3D Outdoor Scene Scanner Based on a Night-Vision Range-Gated Active Imaging System," 3D Data Processing Visualization and Transmission, International Symposium on, pp. 938-945, Third International Symposium on 3D Data Processing, Visualization, and Transmission (3DPVT'06), 2006

Patent Literature

Patent Literature 1: JP S62-175683A

DISCLOSURE OF INVENTION

Technical Problem

By the way, in a flight control system of an aircraft of the past, there are following drawbacks when fog is generated.

In the first place, in order to project the light of the laser pointer on the target object, it is necessary that an operator can visually recognize where the target object is located, but there was a possibility that the operator is unable to visually recognize the target object in the fog.

Then, if the above-described gated imaging device is used, the target object can be visually recognized even in the fog, but it was necessary to cause the gated imaging device and the laser pointer to cooperate.

In addition, even if the light of the laser pointer can be projected toward the target object, the projected light is also reflected from the fog existing between the laser pointer and the target object.

Therefore, the light reflected by the fog and the light that reaches the target object and is reflected by the target object are detected by the flying object, but which light to fly toward is needed to be judged.

The present disclosure has been made in view of such a situation, and particularly causes the gated imaging device and the laser pointer to cooperate to visually recognize the target object even in a translucent substance such as fog, in order to guide the flying object to the target object appropriately.

Solution to Problem

According to a first aspect of the present disclosure, there is provided an information processing apparatus that indicates a direction that the information processing apparatus pays attention to, with a spotlight, including: a gated imaging unit configured to capture a gated image; and a spotlight projecting unit configured to project the spotlight. The spotlight projecting unit projects the spotlight in a same direction as an image capturing direction of the gated imaging unit.

The gated imaging unit can intermittently capture the gated image during a first period, the spotlight projecting unit can intermittently project the spotlight during a second period that is different from the first period, and the first period and the second period can be repeated alternately.

The spotlight projecting unit can project the spotlight by emitting pulse light at predetermined intervals.

An input unit configured to input a distance to a target object; and a display unit configured to display an image captured by the gated imaging unit can be further included. The direction for projecting the spotlight of the spotlight projecting unit is settable to a predetermined direction by a user, and in a case where the predetermined direction and the distance are identical with a direction and a distance in which the target object exists, the gated imaging unit can capture the gated image of the target object, and the imaged target object can be displayed on the display unit as the gated image.

When the predetermined direction and the distance are identical with a direction and a distance in which a predetermined target object exists, and the target object is displayed on the display unit as the gated image, the spotlight projecting unit can project the spotlight to the target object that exists in the same direction as the image capturing direction of the gated imaging unit.

According to the first aspect of the present disclosure, there is provided an information processing method of an information processing apparatus that indicates a direction that the information processing apparatus pays attention to, with a spotlight, the information processing method including steps of: capturing a gated image; and projecting the spotlight. The spotlight is projected in a same direction as an image capturing direction of the gated image.

In the first aspect of the present disclosure, the gated image is captured, the spotlight is projected, and the spotlight is projected in the same direction as the image capturing direction of the gated image.

According to a second aspect of the present disclosure, there is provided an information processing apparatus that detects a direction that another information processing apparatus pays attention to, including: an arriving light detecting unit configured to detect a light amount of reflected light when a spotlight that the other information processing apparatus projects in the direction that the other information processing apparatus pays attention to is reflected by a target object, together with a time; and a maximum value detecting unit configured to detect a maximum value of the light amount detected by the arriving light detecting unit, together with a time, within a predetermined period.

The arriving light detecting unit can further detect an arrival direction of the reflected light, and the information processing apparatus can further include a direction detecting unit configured to detect the direction that the other information processing apparatus pays attention to, by specifying the arrival direction of the reflected light on a basis of a time at which the light amount of the reflected light is a maximum value.

The predetermined period can be designated by the other information processing apparatus.

The maximum value detecting unit can repeat, a plurality of times, a process of detecting the maximum value of the light amount detected by the arriving light detecting unit together with the time, during each predetermined period.

The predetermined period can be a period during which the arriving light detecting unit is able to receive the reflected light set on a basis of a distance from an own position to the target object.

The predetermined period can be a period during which the arriving light detecting unit is able to receive the reflected light set on a basis of a distance obtained by subtracting an own moving distance from a distance from the own position to the target object.

A flying object whose flight is controlled by the direction detecting unit can be further included. The direction detecting unit can control the flying object to fly in a direction of the target object that the other information processing apparatus pays attention to.

According to the second aspect of the present disclosure, there is provided an information processing method of an information processing apparatus that detects a direction that another information processing apparatus pays attention to, the information processing method including steps of: detecting a light amount of reflected light, from a predetermined target object, of light that the other information processing apparatus projects in the direction that the other information processing apparatus pays attention to, together with a time; and detecting a maximum value of the detected light amount together with a time, within a predetermined period.

In the second aspect of the present disclosure, the light amount of the reflected light, from the predetermined target object, of the light projected toward the direction that another information processing apparatus pays attention to is detected together with the time, and the maximum value of the detected light amount is detected together with the time within the predetermined period.

Advantageous Effects of Invention

According to one aspect of the present disclosure, it is possible to appropriately guide a flying object to a target object even in a case where a translucent substance such as fog exists.

BRIEF DESCRIPTION OF DRAWINGS

FIGS. 11A and 11B are diagrams for describing second operation before a flying object flies and second operation after a flying object has flown.

MODE(S) FOR CARRYING OUT THE INVENTION

Figure 1:
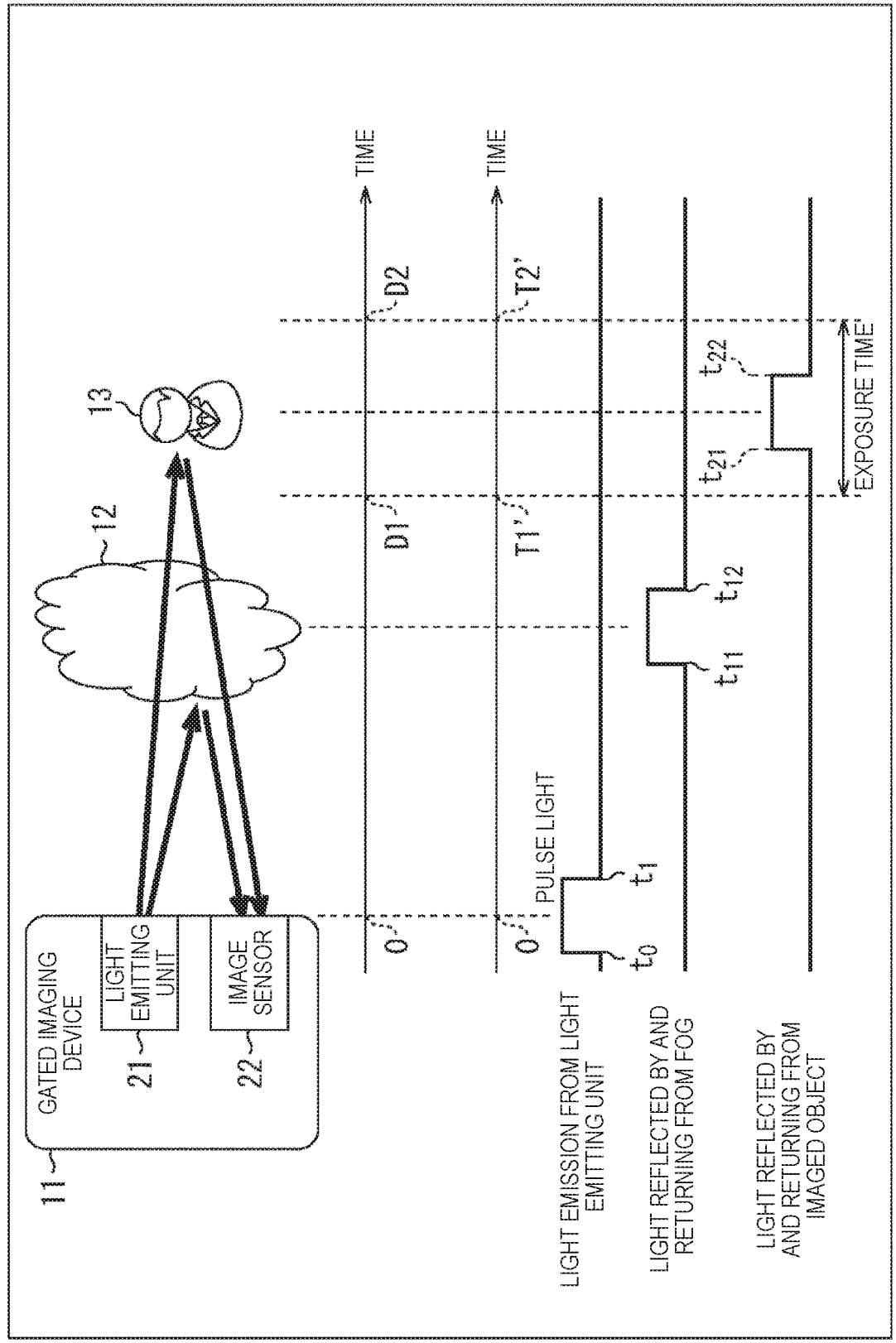
FIG. 1 is a block diagram illustrating a configuration example of a gated imaging device.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

<Regarding Gated Imaging>

A flight control system of the present disclosure performs control to appropriately guide the flight of a flying object even in a case where a translucent substance such as fog exists, by a combination of gated imaging and a laser pointer indicating a direction of the gated imaging.

Thus, in describing the flight control system of the present disclosure, the principle of gated imaging will be described first.

FIG. 1 is a diagram for describing a configuration of a gated imaging device 11 that performs gated imaging and its principle.

The gated imaging device 11 includes a light emitting unit 21 that emits pulse light and an image sensor 22 that captures an image of a target object, which is an imaged object, by receiving reflected light.

For example, an imaged object 13 is assumed to be imaged by using the gated imaging device 11 in a state illustrated in FIG. 1. That is, it is assumed that fog 12 is generated around the middle between the gated imaging device 11 and the imaged object 13.

In this case, as illustrated in FIG. 1, the image sensor 22 receives only the reflected light from the imaged object 13 without receiving the reflected light from the fog 12, by setting such that only reflected light from a range between a distance D1 and a distance D2 between which the imaged object 13 exists (that is, an exposure start time T1+=(2× D1)/c and an exposure end time T2'=(2×D2/c) is received.

As a result, the image sensor 22 can capture a sharp projection image of the imaged object 13. Here, "distance to the fog 12"<distance D1<"distance to the imaged object 13"<distance D2. The light that is reflected by the fog 12 and returns after pulse light is emitted is earlier than the time T1'=(2×D1)/c, and thus the light is not received by the image sensor 22.

By the gated imaging of the above principle, the gated imaging device 11 can capture a sharp image of only the imaged object 13 existing at a predetermined distance, even in a state where the translucent substance such as the fog 12 exists between the imaged object 13 and the gated imaging device 11.

Configuration Example of Flight Control System of Present Disclosure

Next, an overview of the flight control system for controlling the guidance of the flight direction of the flying object by causing the gated imaging device 11 and the laser pointer to cooperate will be described.

Figure 2:
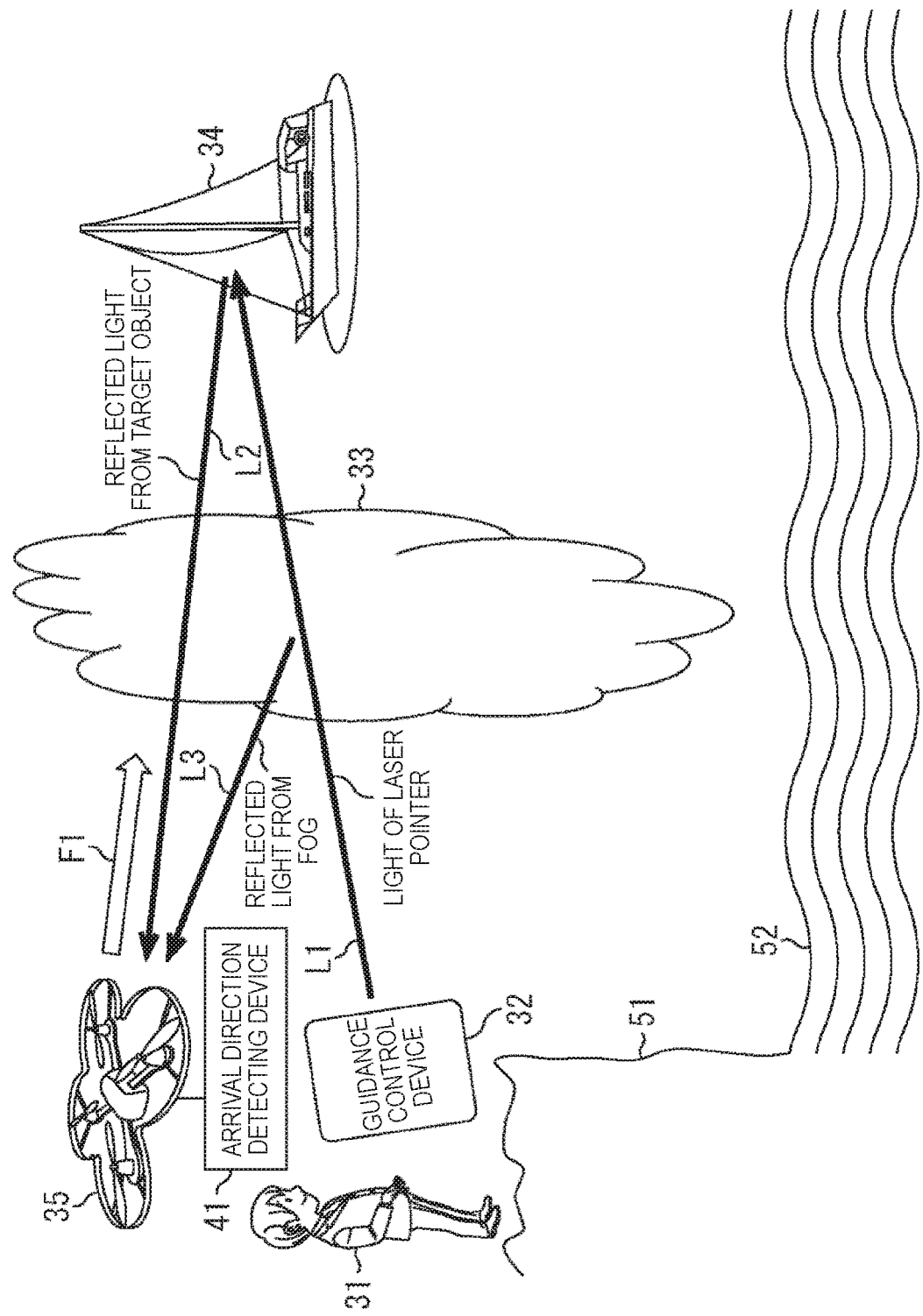
FIG. 2 is a diagram for describing an overview of a flight control system of the present disclosure.

As illustrated in FIG. 2, in this flight control system, an operator 31 operates the guidance control device 32 from a quay wall 51 (inputs distance information and changes the pointing direction of the laser pointer) to guide the flight of a guided flying object 35 such as a drone carrying relief supply to a target object 34 which is a ship such as a yacht drifting in the sea 52, in order to deliver the relief supply from the flying object 35 to the ship of the target object 34, for example.

At this time, it is assumed that fog 33 is generated between the quay wall 51 and the target object 34. The light L1 from a laser pointer 72 (FIG. 4) provided in the guidance control device 32 is reflected when the light L1 reaches the target object 34, and reaches the flying object 35 such as the drone carrying the relief supply (not depicted) as reflected light L2. For example, the flying object 35 flies in a flight direction F1, aiming the direction from which this reflected light L2 arrives.

Since the target object 34 such as the yacht is drifting, its position changes with time. Therefore, the operator 31 adjusts the orientation of the guidance control device 32, in such a manner that the light L1 from the laser pointer 72 is always projected toward the target object 34.

Figure 3:
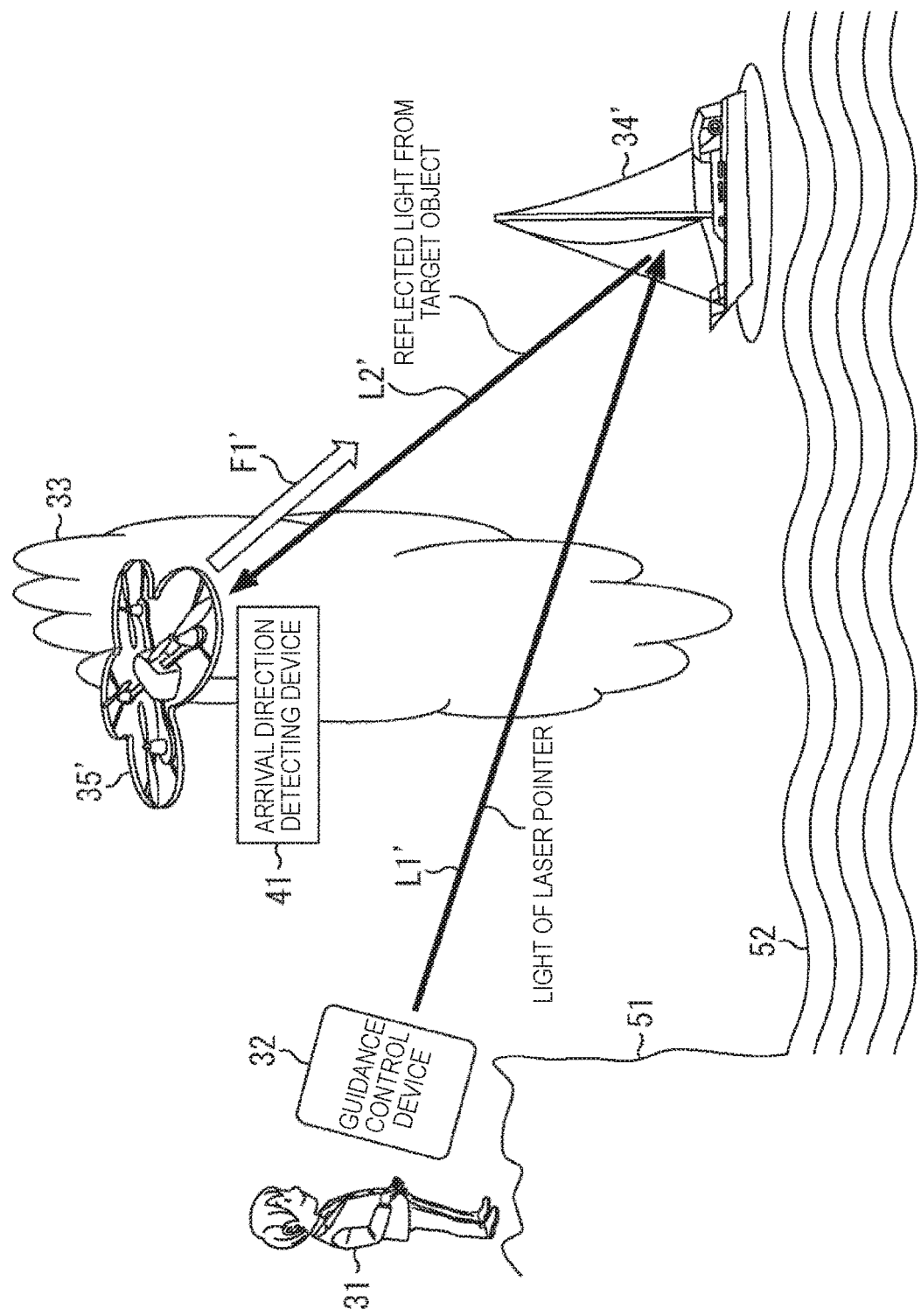
FIG. 3 is a diagram for describing an overview of a flight control system of the present disclosure.

For example, the state illustrated in FIG. 2 changes to a state illustrated in FIG. 3, at the next time (for example, after 2/60 second) after the lapse of a predetermined time. At this time, the target object 34' in FIG. 3 moves (drifts) to the lower right direction in the drawing as compared with the state illustrated with the target object 34 in FIG. 2.

Then, the operator 31 adjusts the orientation of the guidance control device 32 in such a manner that the light L1 from the laser pointer 72 is projected to the target object 34 that has moved in the lower right direction in the drawing. Also, the flying object 35 has flown in the flight direction F1, and thus has moved to the flying object 35' illustrated in FIG. 3. The light L1' from the laser pointer 72 provided in the guidance control device 32 reaches the target object 34', and is reflected as the reflected light L2', and reaches the flying object 35' carrying the relief supply. The flying object 35' flies toward a flight direction F1' which is the direction of the target object 34', by aiming the arrival direction of the reflected light L2'.

By continuously projecting the light L1 or L1' from the laser pointer 72 toward the target object 34 or 34' at all times, the flying object 35 or 35' can approach the target object 34 or 34'. Ultimately, the flying object 35 collides with the target object 34, and for example if the light from the laser pointer 72 is continuously projected to the sail of the yacht which is the target object 34, the flying object 35 such as the drone collides with the sail of the yacht and falls, for example. If the flying object 35 collides with the sail and falls, the flying object 35 is destroyed, but the relief supply carried by the flying object 35 can be delivered to the crew of the yacht.

Of course, a collision avoidance device (not depicted) may be attached to the flying object 35, so that the flying object 35 descends and lands automatically just before the collision. In this way, it is possible to land the flying object 35 on the deck of the yacht, without destroying the flying object 35. Note that detailed description of the collision avoidance device will be omitted.

By the way, as described with reference to FIG. 2, the light L1 from the laser pointer 72 is also reflected by the fog 33 and reaches the flying object 35 as reflected light L3. It is necessary that the flying object 35 distinguishes the reflected light L3 from the reflected light L2. In addition, the operator 31 needs to project the light from the laser pointer 72 toward the target object 34 on a far side of the fog 33. By satisfying such needs, the flight control system of the present disclosure can visually recognize the target object even in the translucent substance such as the fog, in order to guide the flying object to the target object.

Figure 4:
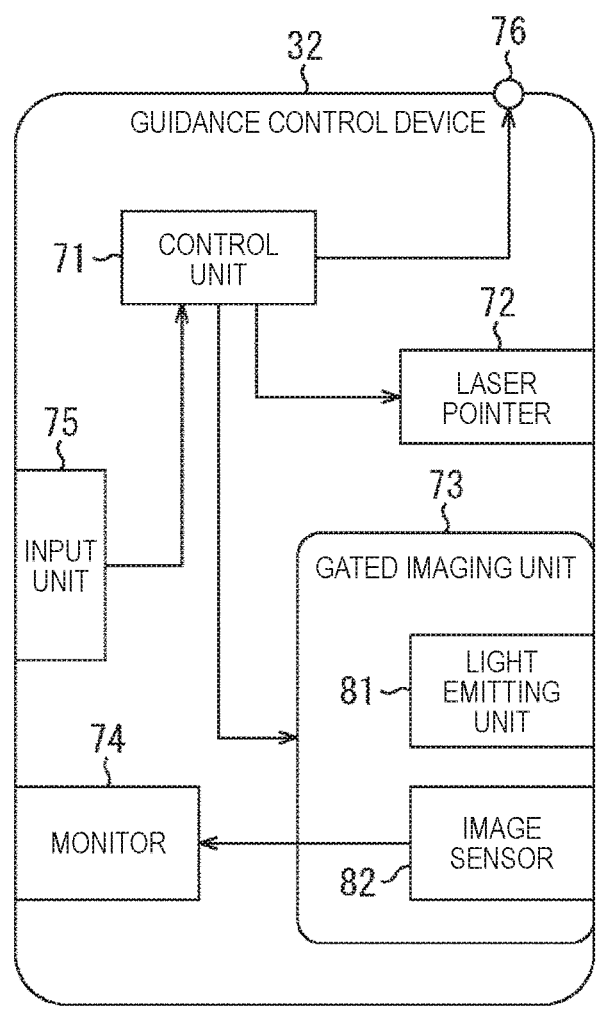
FIG. 4 is a block diagram illustrating a configuration example of a guidance control device of the present disclosure.

Configuration Example of Guidance Control Device in Flight Control System of Present Disclosure Next, a configuration example of the guidance control device 32 in the flight control system of the present disclosure will be described with reference to FIG. 4.

The guidance control device 32 includes a control unit 71, a laser pointer 72, a gated imaging unit 73, a monitor 74, and an input unit 75.

The control unit 71 controls the operation of the gated imaging unit 73 and controls light emission of the laser pointer 72. In addition, when the operator 31 operates the input unit 75 to input the distance information to the target object 34, the input unit 75 supplies the distance information to the target object 34 according to the operation content to the control unit 71. In addition, when the operator 31 operates the input unit 75 to instruct a flight start of the flying object 35, the input unit 75 supplies an instruction of the flight start to the control unit 71. The control unit 71 instructs flight of the flying object 35 on the basis of this instruction.

In addition, the control unit 71 generates a synchronization pulse signal and outputs the synchronization pulse signal from a synchronization timing output terminal 76 to an arrival direction detecting device 41 connected to the flying object 35.

The gated imaging unit 73 includes a light emitting unit 81 and an image sensor 82. The gated imaging unit 73 is similar to the gated imaging device 11 described with reference to FIG. 1, and thus the light emitting unit 81 and the image sensor 82 are also similar to the light emitting unit 21 and the image sensor 22.

That is, the image sensor 82 controls the light emitting unit 81 to emit light at a timing set on the basis of the predetermined distance information input by the input unit 75, and captures an image of the target object 34 at the predetermined distance, and causes the target object 34 to be displayed on the monitor 74 such as liquid crystal display (LCD) and organic electro luminescence (EL).

Figure 5:
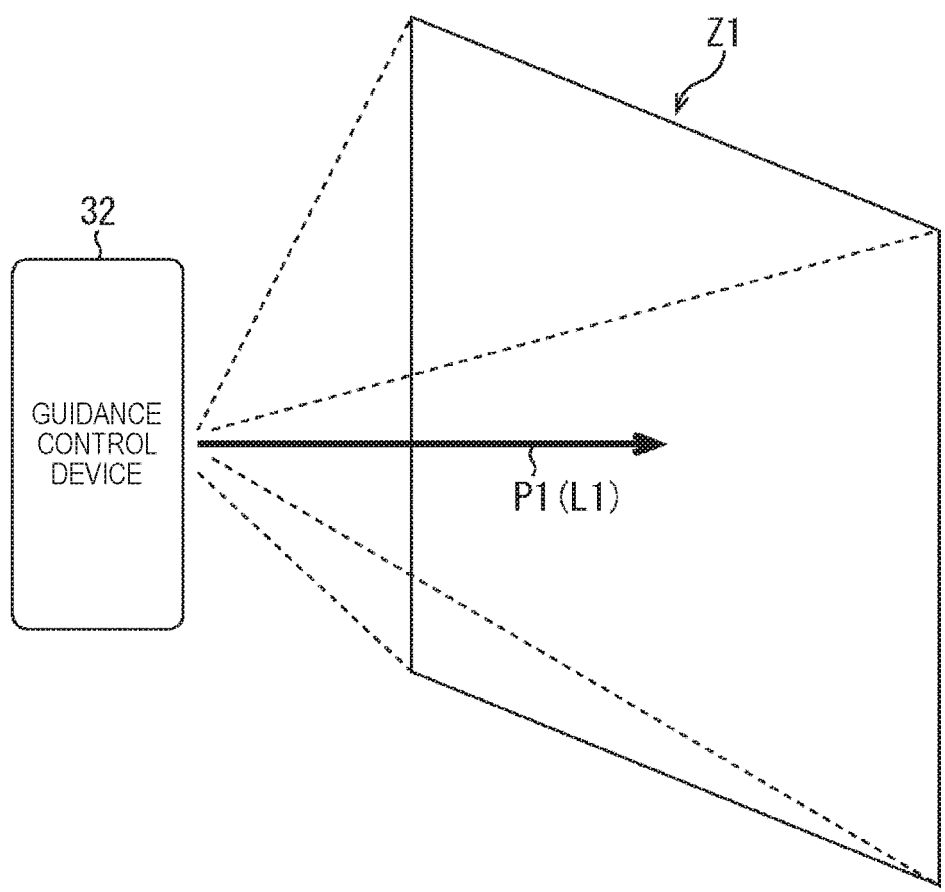
FIG. 5 is a diagram illustrating a relationship between an imaged area of a gated imaging unit and an emission direction of a laser pointer in a guidance control device.

For example, as illustrated in FIG. 5, the laser pointer 72 projects pulse laser light (the light L1 of FIG. 2) toward a direction P1 in which the laser light transmits through a substantially center position of an imaged area Z1 of the image sensor 82 substantially perpendicularly to an imaging surface.

Note that an optical block such as a lens is actually provided in front of the image sensor 82, and the image of the imaged object is collected by the optical block, so that the image of the imaged object is projected and formed onto the imaging surface of the image sensor 82.

That is, the laser light is projected in the direction P1 in which the laser light transmits through the substantially center position of the imaged area Z1 in the image sensor 82 of the gated imaging unit 73, and thereby the light of the laser pointer 72 is appropriately projected to the target object 34, by the operator 31 merely watching the monitor 74 and adjusting the orientation of the guidance control device 32 to position the object 34 at the center position of the monitor 74.

<Operation of Guidance Control Device>

Next, the operation of the guidance control device 32 will be described.

When thinking about sending the relief supply by the flying object 35, the operator 31 at the quay wall 51 is unable to visually recognize the target object 34 clearly due to the fog 33 at an initial stage, and thus is unable to recognize the direction and the distance to the target object 34.

Therefore, the operator 31 needs to direct the gated imaging unit 73 of the guidance control device 32 in various directions, and set various distances, and execute gated imaging, and repeat these until the yacht as the target object 34 appears in the monitor 74.

As described above, the gated imaging unit 73 can capture the sharp image of the object located at a specific distance only. Since the distance to the target object 34 is unknown, imaging of various distances is attempted. Designation of the distance is performed by the input unit 75. Information of the distance input by operating the input unit 75 is supplied to the control unit 71. The control unit 71 controls the light emitting unit 81 of the gated imaging unit 73 to emit pulse light, and controls the exposure of the image sensor 82 so as to perform exposure for an appropriate exposure time depending on the distance input by the input unit 75.

Note that the appropriate exposure time means a minute time after emitting the pulse light by the light emitting unit 81, which is centered at (2×"distance input by the input unit 75")/c (c: light speed).

In the initial stage, the operator 31 tries various directions and distances, but once the target object 34 is found, the operator 31 thereafter observes the clear image of the target object 34 transferred to the monitor 74, and finely adjusts the direction of the guidance control device 32 in such a manner that the image of the target object 34 appears at the center of the monitor 74. Then, the operator 31 instructs a flight start of the flying object 35, by means of the input unit 75.

When the instruction of flight start is transmitted to the control unit 71, the control unit 71 causes a signal (synchronization pulse signal) of an appropriate synchronization timing to be output from the synchronization timing output terminal 76 to the arrival direction detecting device 41 of the flying object 35.

Figure 6:
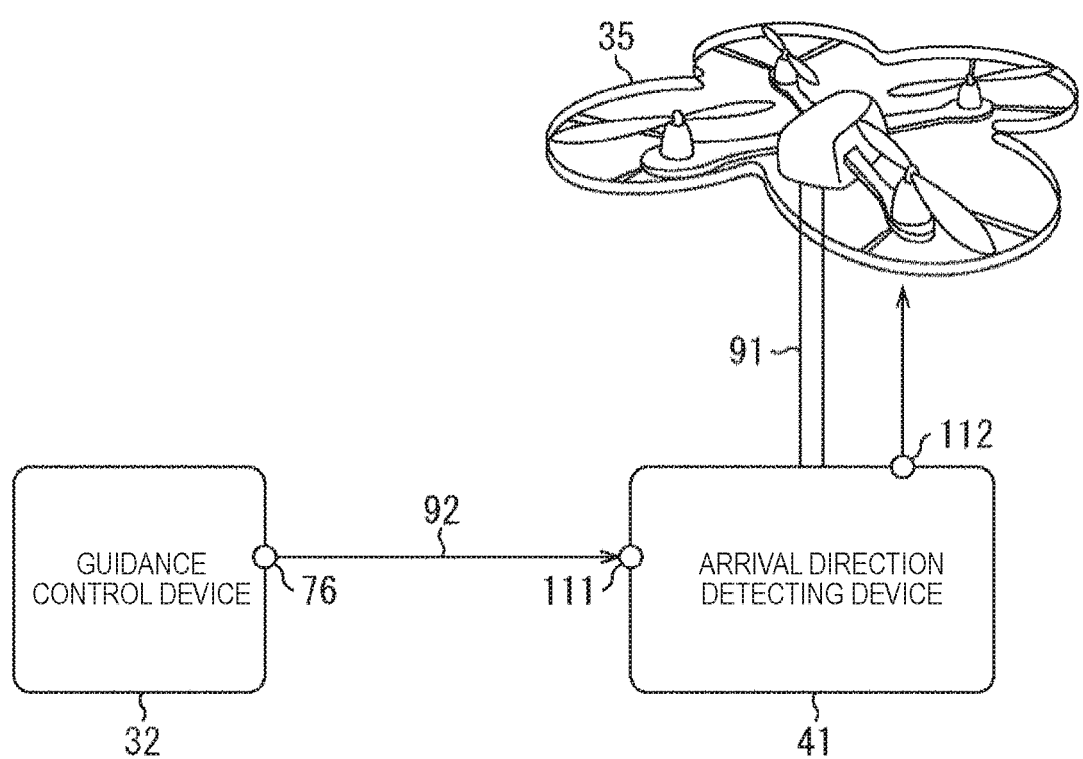
FIG. 6 is a diagram for describing a configuration example of a flight control system.

Note that as illustrated in FIG. 6, the synchronization timing output terminal 76 is electrically and physically connected to a synchronization timing input terminal 111 (FIG. 9) of the flight direction detecting device 41 (FIG. 9) provided in the flying object 35 by using a wire 92. The arrival direction detecting device 41 is integrated with the main body of the flying object 35 by a support column 91. The flight direction detecting device 41 judges a flight direction (detail will be described later) and transmits the flight direction to the flying body 35 main body via a flight direction instruction output terminal 112. Then, the flying object 35 flies to move in the transmitted direction.

Also, the wire 92 is made of a thin transmission line that is easy to break, and is configured to be cut, as the flying object 35 starts flying, and as the flying object 35 (that is, the arrival direction detecting device 41) and the guidance control device 32 separate from each other.

As described with reference to FIG. 3, even after the instruction of flight start, the operator 31 continuously and finely adjusts the orientation of the guidance control device 32 at all times, in such a manner that the target object 34 is located at the center position of the monitor 74, while watching the monitor 74.

<Regarding Operation of Gated Imaging and Laser Pointer>

Next, with reference to the timing chart of FIG. 7, the operation of the guidance control device 32 will be described in temporal order.

Figure 7:
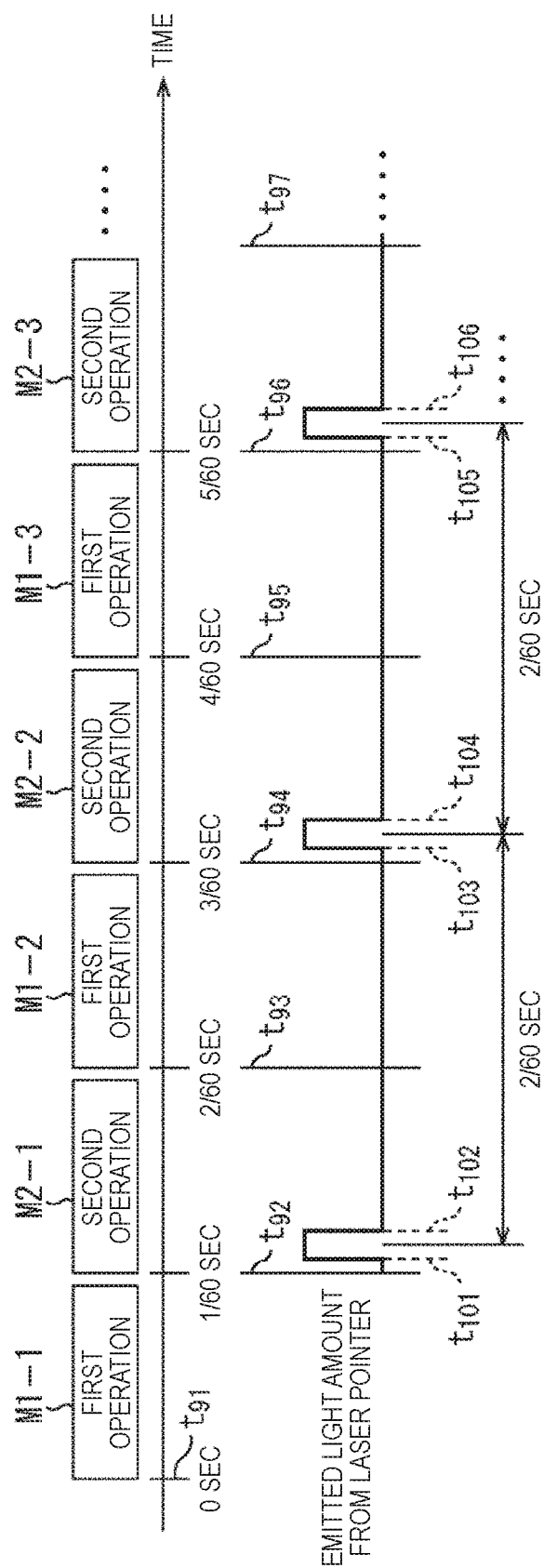
FIG. 7 is a timing chart for describing a flight control process.

As illustrated in FIG. 7, first operation M1-$x$ and second operation M2-$x$ ($x$=1, 2, 3, . . . ) are alternately switched every 1/60 second and are operated at times t91, t92, t93 . . . . For 1/60 second of the first operation M1-$x$, gated imaging is performed by the gated imaging unit 73, and display is performed on the monitor 74 in real time. As a result, the operator 31 can watch the clear image of the target object 34 every 2/60 second. In 1/60 second of the second operation M2-$x$, the laser pointer 72 first emits pulse light.

Since the operator 31 finely adjusts the orientation of the guidance control device 32 at all times in such a manner that the projection image of the target object 34 appears at the center of the monitor 74 as described above, the pulse light from the laser pointer 72 is continuously projected on the target object 34 even when the target object 34 continuously moves. Since the second operation M2-$x$ is repeated every 2/60 second, the emission interval of the pulse light from the laser pointer 72 is 2/60 second. Here, the pulse light from the laser pointer 72 is from time t101 to t102, from t103 to t104, . . . , and each timing is an intermediate time.

The period of the second operation M2-$x$ is provided separately from the period of the gated imaging (the first operation M1-$x$). Thus, it is possible to distinguish the light emission from the laser pointer 72 indicating the target and the light emission from the light emitting unit 81 in the gated imaging.

It is assumed that, in the first operation M1-1, the operator 31 can direct the guidance control device 32 in an appropriate direction. That is, it is assumed that the projection image of the target object 34 appears at the center of the monitor 74. At this time, the operator 31 instructs a flight start from the input unit 75.

In the second operation M2-1 (the second operation M2-$x$ immediately after the instruction of flight start is input from the input unit 75), the control unit 71 instructs the laser pointer 72 to emit pulse light, and then outputs a synchronization pulse signal from the synchronization timing output terminal 76 at a time delayed by a time (T1-ΔT1) after the light emission. Here, T1 is a round-trip time T1=(2×D)/c, which is calculated from the light speed c and a round-trip distance 2D, when the distance instructed by the input unit 75 immediately before is D. Also, ΔT1 is a value considering an error of distance measurement, and is a predetermined minute value.

Upon receipt of the synchronization pulse signal from the synchronization timing input terminal 111, the arrival direction detecting device 41 detects the reflected light L2 which is the pulse light from the laser pointer 72 (the pulse light emitted in the second operation M2-1) reflected by the target object 34. Then, the arrival direction detecting device 41 instructs the flying object 35 to fly in that direction, via the flight direction instruction output terminal 112. Thereby, the flying object 35 starts flying in an appropriate direction, that is, toward the target object 34. As described earlier, the wire 92 is pulled and cut off immediately after the second operation M2-1.

That is, thereafter, the flying object 35 starts autonomous flight on the basis of the information projected by the laser pointer 72 of the guidance control device 32.

<Guidance Control Method>

Figure 8:
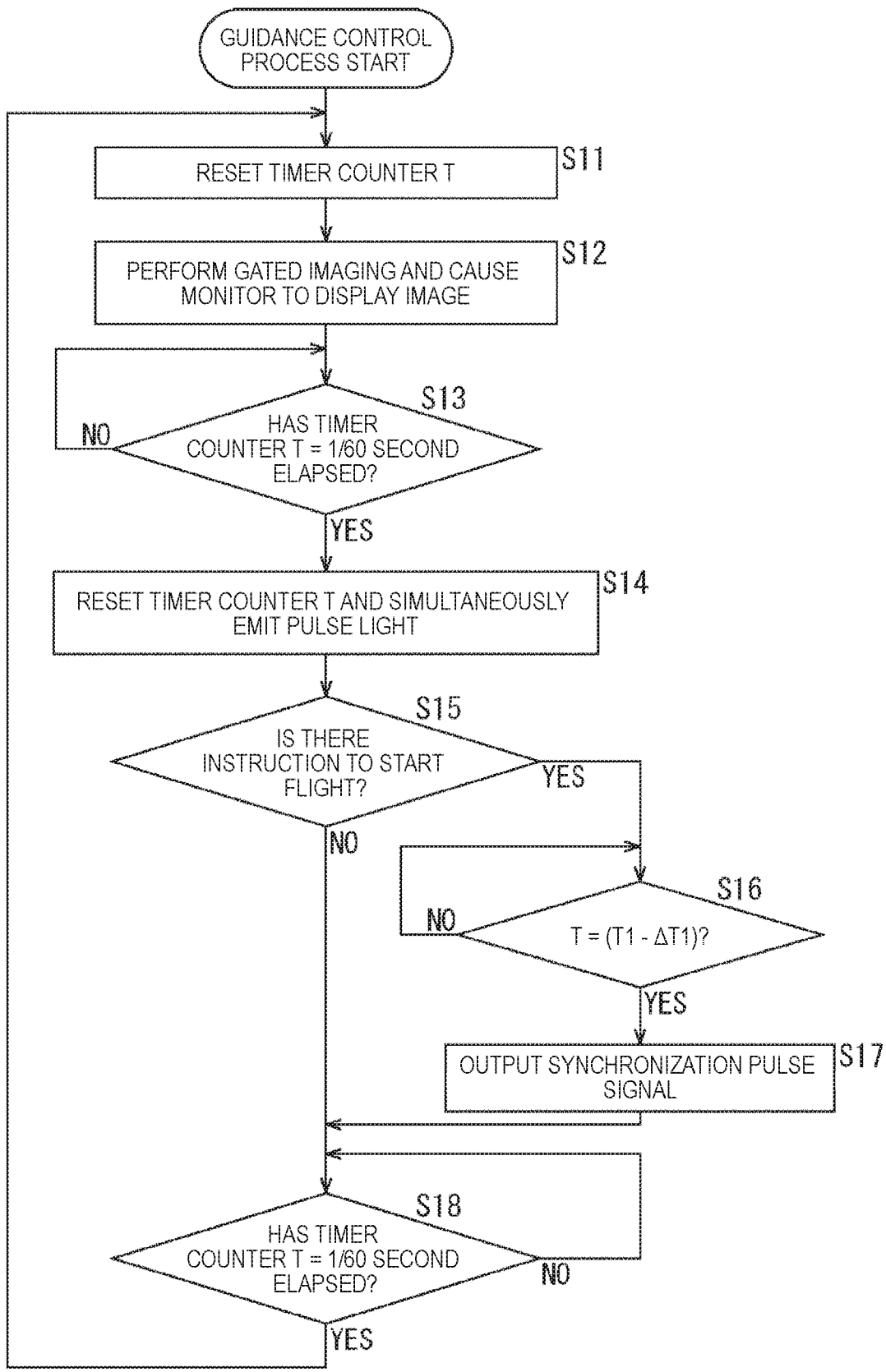
FIG. 8 is a flowchart for describing a guidance control process.

Here, with reference to the flowchart of FIG. 8, a guidance control method by the guidance control device 32 will be described.

In step S11, the control unit 71 resets a timer counter T (not depicted) to 0. Note that the timer counter T can measure a time equal to or shorter than 1/60 second.

In step S12, the control unit 71 controls the gated imaging unit 73 to perform gated imaging, and causes the captured image to be displayed on the monitor 74. More specifically, the gated imaging unit 73 controls the light emitting unit 81 at a timing according to the distance input from the input unit 75 to emit pulse light, and captures, by the image sensor 82, the reflected light which is the pulse light emitted from the light emitting unit 81 and reflected by the target object 34 existing at the input distance.

In step S13, the control unit 71 determines whether or not the timer counter T has counted 1/60 second, and repeats a similar process until the timer counter T counts 1/60 second. Then, in a case where it is determined that 1/60 second has been counted in step S13, the process proceeds to step S14.

In step S14, the control unit 71 resets the timer counter T to 0, and controls the laser pointer 72 to emit pulse light.

In step S15, the control unit 71 determines whether or not the input unit 75 has been operated to instruct a flight start. In a case where the flight start has not been instructed in step S15, the process proceeds to step S18.

In step S18, the control unit 71 determines whether or not the timer counter T has counted 1/60 second, and repeats a similar process until the timer counter T counts 1/60 second. Then, in a case where 1/60 second has been counted in step S18, the process returns to step S11, and the subsequent process is repeated.

That is, the processing of the first operation M1-x is performed at 1/60 second intervals by the process of steps S11 to S13, and thereafter the processing of the second operation M2-x is performed at 1/60 intervals by the process of steps S14, S15, and S18, so that the processings of the first operation M1-x and the second operation M2-x are repeated alternately.

Meanwhile, the above process is repeated until the target object 34 is displayed at the center of the monitor 74, while the distance set by the input unit 75 and the orientation of the guidance control device 32 are changed.

Then, in a case where the target object 34 is displayed at the center of the monitor 74 in order to allow a flight start to be instructed, the process proceeds to step S16 in a case where the input unit 75 is operated to instruct a flight start in step S15, for example.

In step S16, the control unit 71 determines whether or not the value of the timer counter T has reached T1-ΔT1.

In a case where the timer counter T has reached T1-ΔT1 in step S16, the process proceeds to step S17.

In step S17, the control unit 71 outputs a synchronization pulse signal from the synchronization timing output terminal 76, and the process proceeds to step S18.

As a result of this process, the flying object 35 such as the drone starts flying, and along with this, the wire 92 connecting the arrival direction detecting device 41 of the flying object 35 and the guidance control device 32 is pulled and cut off after the flying object 35 has moved a predetermined distance.

Configuration Example of Arrival Direction Detecting Device

Next, with reference to the block diagram of FIG. 9, a configuration example of the arrival direction detecting device 41 of the present disclosure will be described.

The arrival direction detecting device 41 operates in pair with the guidance control device 32. The arrival direction detecting device 41 detects the reflected light L2 which is the pulse light emitted at intervals of 2/60 second from the laser pointer 72 of the guidance control device 32 and reflected by the target object 34. The arrival direction detecting device 41 controls the flight of the flying object 35 so that the flying object 35 flies in a direction in which the reflected light L2 is detected.

Figure 9:
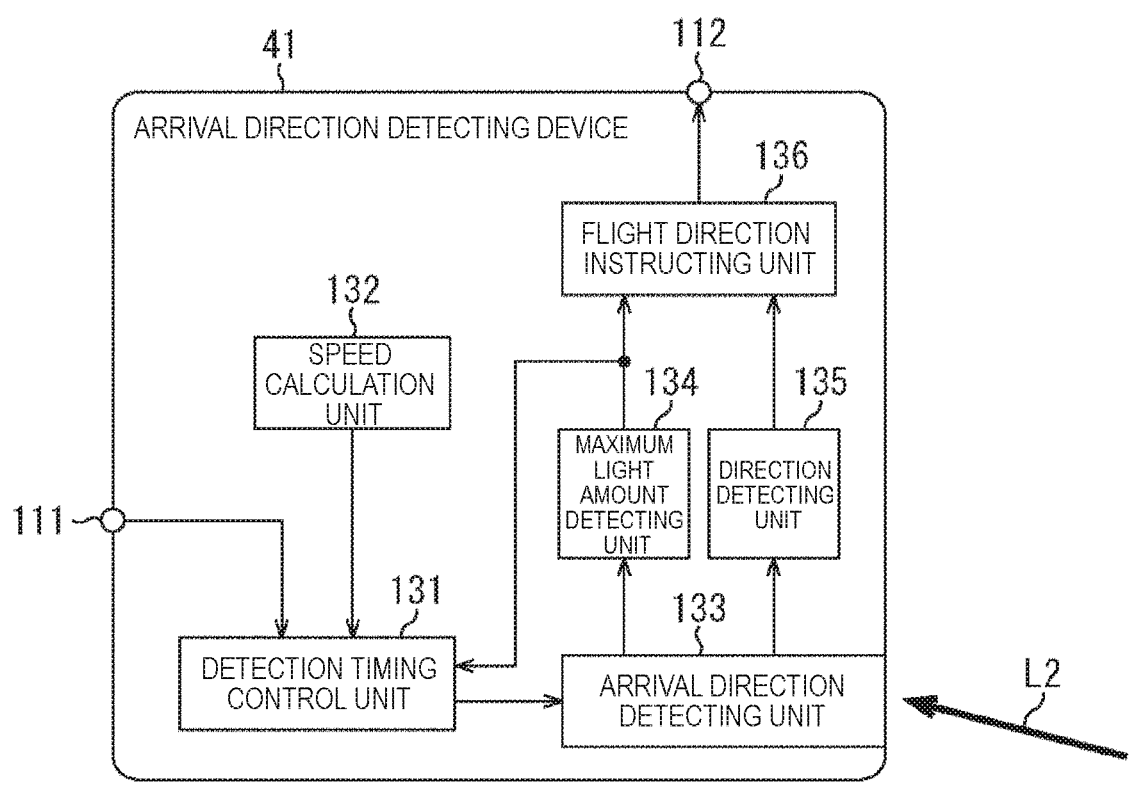
FIG. 9 is a block diagram for describing a configuration example of a flight control device.

As illustrated in FIG. 9, the arrival direction detecting device 41 includes a detection timing control unit 131, a speed calculation unit 132, an arrival direction detecting unit 133, a maximum light amount detecting unit 134, a direction detecting unit 135, an arrival direction instructing unit 136, a synchronization timing input terminal 111, and an arrival direction instruction output terminal 112.

Basically, the arrival direction detecting device 41 does not operate until the arrival direction detecting device 41 receives a synchronization pulse signal from the guidance control device 32, via the synchronization timing input terminal 111. Upon receiving the synchronization pulse signal from the guidance control device 32 via the synchronization timing input terminal 111 (the second operation M2-1 in FIG. 7), the detection timing control unit 131 controls and operates the arrival direction detecting unit 133 for a period of 2×ΔT1. Note that ΔT1 is a predetermined minute value.

The arrival direction detecting unit 133 detects the intensity and direction of the light that arrives at the arrival direction detecting device 41, and is for example HARLID (High Angular Resolution Laser Irradiance Detector) (trademark), which is a product of Excelitas Technologies Corporation, or the like. That is, as illustrated in FIG. 9, when the reflected light L2 is incident, the arrival intensity and the arrival direction are detected, and light intensity data among the detection results is supplied to the maximum light amount detecting unit 134, and arrival direction data is supplied to the direction detecting unit 135.

The arrival direction detecting unit 133 supplies the light intensity data, which is obtained sequentially, to the maximum light amount detecting unit 134. The maximum light amount detecting unit 134 detects a time at which the light amount becomes maximum during the period of 2×ΔT1 in which the arrival direction detecting unit 133 is operating, and supplies the time to the detection timing control unit 131 and the arrival direction instructing unit 136.

The direction detecting unit 135 continuously records the arrival direction during the period of 2×ΔT1 in which the arrival direction detecting unit 133 is operating, and records the time and the arrival direction as data associated with each other, and supplies the data to the arrival direction instructing unit 136.

The arrival direction instructing unit 136 acquires, from the direction detecting unit 135, the arrival direction corresponding to the time at which the light amount becomes maximum, which is supplied from the maximum light amount detecting unit 134, and recognizes the arrival direction in which the light amount is maximum during the period of 2×ΔT1.

The arrival direction instructing unit 136 controls the flying object 35 via the arrival direction instruction output terminal 112, to proceed in the arrival direction in which the light amount becomes maximum. Thereby, the flying object 35 can proceed toward the target object 34.

Also, as illustrated in FIG. 7, the flying object 35 starts flying during the operation of the second operation M2-1, and the wire 92 is broken, and thereby the information becomes unable to be transmitted from the guidance control device 32 to the arrival direction detecting device 41. In and after the second operation M2-2, the arrival direction detecting device 41 needs to independently detect the reflected light which is the pulse light emitted from the laser pointer 72 (the pulse light emitted in the second operation M2-x: x is an integer equal to or greater than 2) and reflected by the target object 34, in order to decide the flight direction and continue the flight sequentially, without an instruction from the guidance control device.

For that purpose, speed data of the flying object 35 is required. Thus, a speed calculation unit 132 is provided in the arrival direction detecting device 41. For example, the speed calculation unit 132 includes a global positioning system (GPS) and a clock (for example, real time clock, etc.), and obtains own flight position information with the internal GPS, and calculates the speed by calculating a positional difference per unit time.

<Regarding Operation of Arrival Direction Detecting Device>

Figure 10:
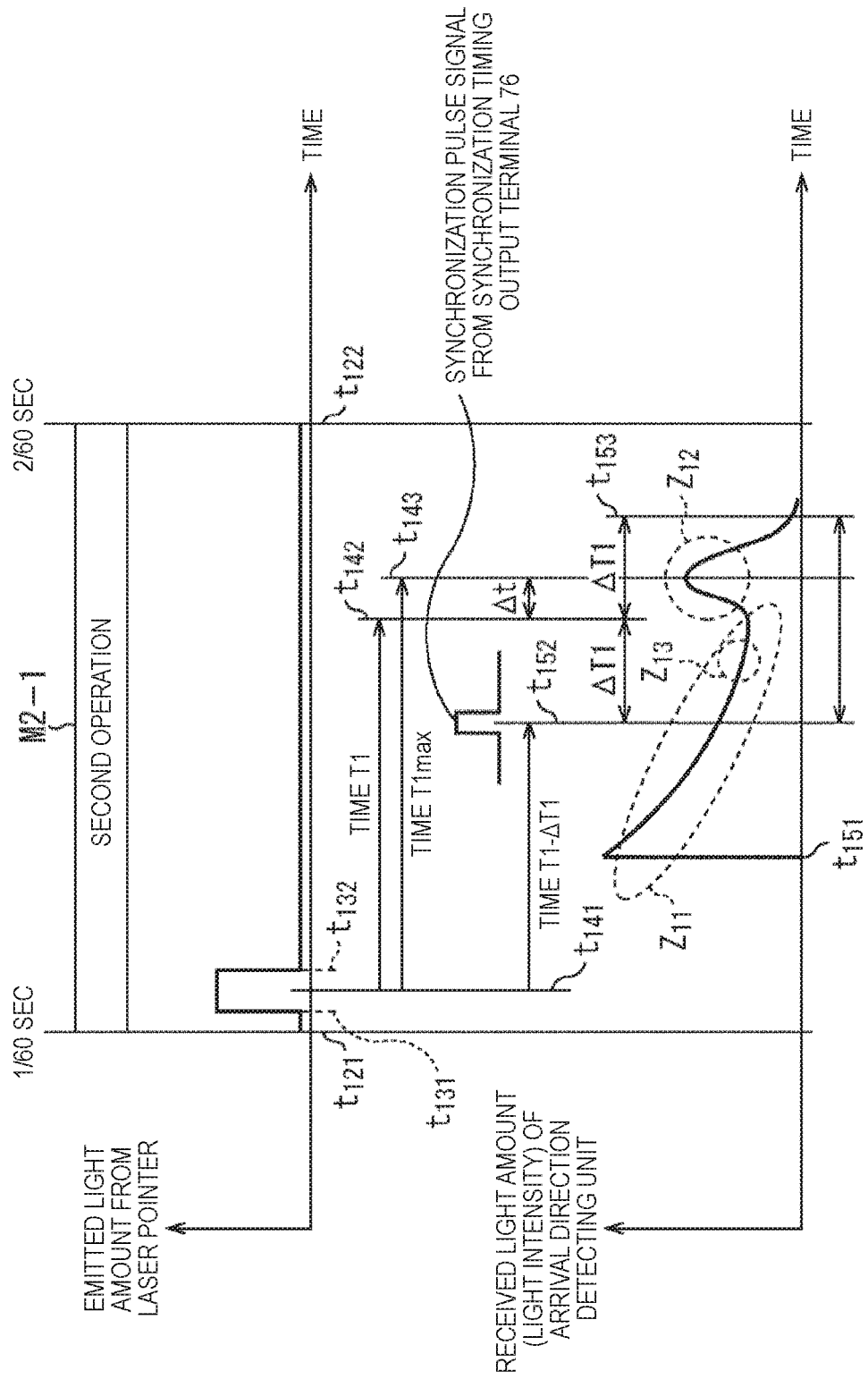
FIG. 10 is a timing chart for describing second operation.

With reference to FIG. 10, the operation of the arrival direction detecting device 41 in the second operation M2-1 (initial operation before starting flight) will be described. In addition, with reference to FIGS. 11A, 11B, and 12, the operation of the arrival direction detecting device 41 in and after the second operation M2-2 (the operation after starting flight) will be described. The description of the second operation M2-x (x is an integer equal to or greater than 3) is similar to the second operation M2-2 (FIGS. 10, 11A, and 11B).

(Initial Operation before Starting Flight)

FIG. 10 illustrates temporal changes of the emission of the pulse light by the laser pointer 72 in the guidance control device 32 during the second operation M2-1 and the received light amount (light intensity) of the arrival direction detecting unit 133 in the arrival direction detecting device 41. As illustrated in FIG. 10, pulse light from the laser pointer 72 is emitted from the first time t121 to t122 in the second operation M2-1. Note that the times t121 and t122 in FIG. 10 are the same as the times t101 and t102 in FIG. 7, respectively.

Since the fog 33 is located in front of the target object 34, the pulse light from the laser pointer 72 is reflected by the fog 33, and thus the arrival direction detecting unit 133 receives the reflected light L3 (FIG. 2) in the initial operation.

Since the fog 33 has a thickness, the period during which the reflected light L3 is received by the arrival direction detecting unit 133 does not end in a moment, but the reflected light is continuously received during a predetermined period. Also, as the light L1 (FIG. 2) of the laser pointer 72 proceeds toward the fog 33, the intensity of the reflected light L3 by the fog 33 decreases. Accordingly, as illustrated by a range Z11 in FIG. 10, the light reception intensity at which the reflected light L3 is received from the fog 33 attenuates with time. In other words, the reflected light L3 has a strong reflection intensity from the front of the fog 33, and a weak reflection intensity from the back side of the fog 33.

The light L1 (FIG. 2) of the laser pointer 72 attenuates while proceeding through the fog (translucent substance) 33, but ultimately reaches the target object 34. The light L1 having reached the target object 34 is completely reflected by the target object 34, generating the reflected light L2 (FIG. 2) to be received. Since the target object 34 is not transparent, the light reception intensity of the reflected light L2 from the target object 34 is stronger than the intensity of the reflected light L3 from the fog (translucent substance) 33 illustrated in a range Z13 which is immediately before the reflection from the target object 34, as illustrated in a range Z12 in FIG. 10.

Also, the time that it takes for the pulse light to be emitted from the laser pointer 72, reach and be reflected by the target object 34, and thereafter reach the arrival direction detecting unit 133 is approximately time T1. Here, the time T1=(2× D)/c (c: light speed), when the distance to the target object 34 in the gated imaging is D. Note that, in the second operation M2-1, the guidance control device 32 and the flying object 35 (the arrival direction detecting device 41) are located at almost the same position.

Moreover, in FIG. 10, an error is taken into consideration. That is, the time from when the pulse light of the laser pointer 72 is emitted to when the pulse light reaches the arrival direction detecting unit 133 is theoretically not the time T1 but the maximum time T1max. That is, the time T1 includes an error, in relation to the maximum time T1max. As illustrated in FIG. 10, an intermediate time t141 between the times t131 and t132, which is the period during which the pulse light is emitted, is a reference time at which the pulse light is emitted; and a theoretical round-trip time that it takes for the pulse light to be reflected by the target object 34 and reach the arrival direction detecting unit 133 is the maximum time Tmax; and the arrival time in this case is time t143; and the arrival time including the error is time t142; and the error is expressed by Δt (=t143−t142).

Thus, the timing, including the error Δt, at which the reflected light L2 is received from the target object 34 is considered to exist at some timing between the elapsed time T1−ΔT1 and the elapsed time T1+ΔT from the emission of the pulse light, in a case where the possible maximum error is assumed to be ΔT1, as illustrated in FIG. 10. Here, the time ΔT1 is theoretically calculated from a system error, and thus is a known value.

To summarize the above, the temporal change of the received light amount (light intensity) of the arrival direction detecting unit 133 has a relationship illustrated in FIG. 10.

That is, after the elapsed time from the emission of the pulse light has passed the time T1-ΔT1, the synchronization pulse signal is input to the synchronization timing input terminal 111 of the arrival direction detecting device 41, from the synchronization timing output terminal 76 of the guidance control device 32, at the time t152. Thus, the detection timing control unit 131 detects the synchronization pulse signal from the synchronization timing input terminal 111, and operates the arrival direction detecting unit 133 only for the time 2×ΔT1 that follows.

As described above, the direction of the reflected light L2 from the target object 34 can be known, by detecting the maximum value (the maximum value at the time t143 in the waveform of FIG. 10) by the maximum light amount detecting unit 134 and knowing the direction at that time from the direction detecting unit 135. In this way, in the second operation M2-1, it is possible to recognize the flight direction (the direction F1 in FIG. 2) to the target object 34.

In this way, the reflected light not from the fog 33 but from the target object 34 can be detected, by detecting the maximum value (the time t143 at which T1max has elapsed since the pulse light emission, in FIG. 10) within a specific time range (here, between the time T1-ΔT1 and the time T1+ΔT1).

(Operation after Flight Start)

Next, the operation in and after the second operation M2-2 will be described. As described above, since the synchronization pulse signal is not transmitted from the guidance control device 32 to the arrival direction detecting device 41, the arrival direction detecting device 41 needs to autonomously detect the reflected light L2 which is the pulse light from the laser pointer 72 that is reflected by the target object 34 and returns, and control the flying object 35 to fly with the reflected light L2 as a target position.

As described with reference to FIG. 7, the pulse light from the laser pointer 72 is emitted every 2/60 second. Thus, the reflected light having the maximum light reception intensity at a timing around 2/60 second after the reception time of the reflected light L2 from the target object 34 in the second operation M2-x may be detected in the process in and after the second operation M2-2. That is, it is a process in the operation expressed by the second operation M2-x, in which x is an integer equal to or greater than 2.

However, in the above description, the moving distance of the flying object 35 (that is, the arrival direction detecting device 41) from the second operation M2-x to the second operation M2-(x+1) is not considered. Thus, here, description considering the moving distance will be given with reference to FIGS. 11A and 11B. Note that, in FIGS. 11A and 11B, components having the same functions as the functions described with reference to FIGS. 2 and 3 are denoted by the same reference numerals and the same names, and description thereof is omitted as appropriate.

That is, the upper part of FIGS. 11A and 11B illustrate the second operation M2-1, that is, the positional relationship between the guidance control device 32, the target object 34, and the flying object 35 (that is, the arrival direction detecting device 41) before the flight start. Noted that the fog 33 is not depicted. Here, it is assumed that the guidance control device 32 and the flying object 35 (that is, the arrival direction detecting device 41) are located at almost the same position, and the distance to the target object 34 is approximately distance D. This is converted to the round-trip time of light, theoretically time T1 max.

Moreover, the lower part of FIGS. 11A and 11B illustrate the second operation M2-2, that is, the positional relationship between the guidance control device 32, the target object 34, and the flying object 35 (that is, the arrival direction detecting device 41) immediately after the flight start.

The second operation M2-2 is performed 2/60 second after the second operation M2-1, and thus the flying object 35 (that is, the arrival direction detecting device 41) proceeds by a distance d, as illustrated in the lower part of FIGS. 11A and 11B. Assuming that the speed of the flying object 35 is V, the moving distance d in FIGS. 11A and 11B. 11 is V×2/60. Thus, the time T2max that it takes for the pulse light to be emitted from the laser pointer 72 in the guidance control device 32, reach and be reflected by the target object 34, and reach the arrival direction detecting unit 133 in the arrival direction detecting device 41 is approximately $\{2 \times D - (V \times 2/60)\}/c$. That is, the time T1max-T2max is approximately $(V \times 2/60)/c$.

That is, the upper part of FIG. 11 illustrates the second operation M2-1, that is, the positional relationship between the guidance control device 32, the target object 34, and the flying object 35 (that is, the arrival direction detecting device 41) before the flight start. Noted that the fog 33 is not depicted. Here, it is assumed that the guidance control device 32 and the flying object 35 (that is, the arrival direction detecting device 41) are located at almost the same position, and the distance to the target object 34 is approximately distance D. This is converted to the round-trip time of light, theoretically time T1max.

Moreover, the lower part of FIG. 11 illustrates the second operation M2-2, that is, the positional relationship between the guidance control device 32, the target object 34, and the flying object 35 (that is, the arrival direction detecting device 41) immediately after the flight start.

The second operation M2-2 is performed 2/60 second after the second operation M2-1, and thus the flying object 35 (that is, the arrival direction detecting device 41) proceeds by a distance d, as illustrated in the lower part of FIG. 11. Assuming that the speed of the flying object 35 is V, the moving distance d in FIG. 11 is V×2/60. Thus, the time T2max that it takes for the pulse light to be emitted from the laser pointer 72 in the guidance control device 32, reach and be reflected by the target object 34, and reach the arrival direction detecting unit 133 in the arrival direction detecting device 41 is approximately $\{2 \times D - (V \times 2/60)\}/c$. That is, the time T1max-T2max is approximately $(V \times 2/60)/c$.

As described above, the round-trip time that it takes for the pulse light to be emitted from the laser pointer 72 in the guidance control device 32, reach and be reflected by the target object 34, and reach the arrival direction detecting unit 133 in the arrival direction detecting device 41 changes gradually with the movement. Hereinafter, this round-trip time is referred to as a round-trip time after flight start.

Figure 12:
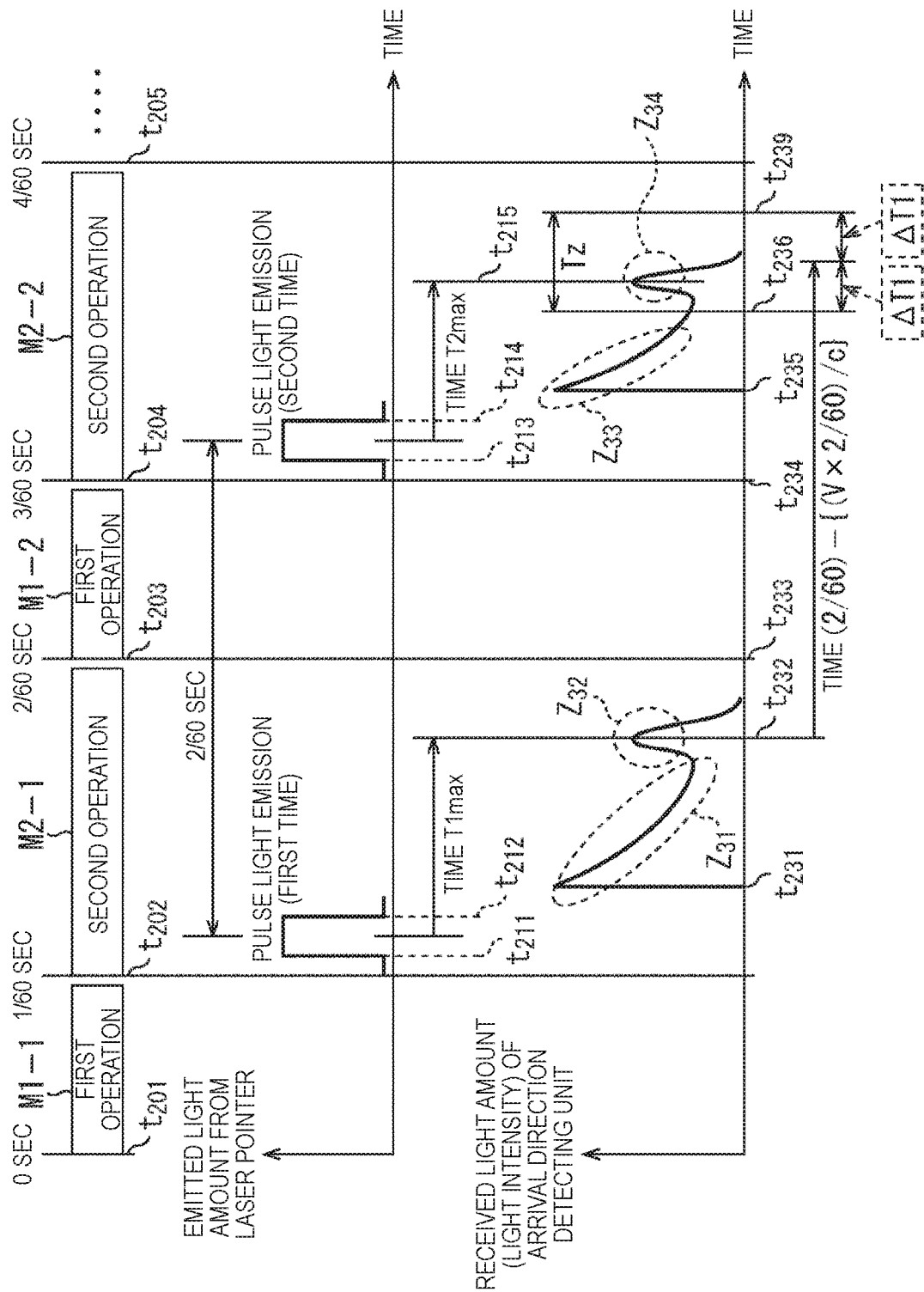
FIG. 12 is a timing chart for describing second operation before a flying object flies and second operation after a flying object has flown.

The change of the round-trip time after flight start is as illustrated in FIG. 12, for example. That is, after the first pulse light emission from a time t211 to a time t212 in the second operation M2-1, the light reception level detected by the arrival direction detecting unit 133 is gradually attenuated by the fog 33 from a first light reception time t231 with reference to an intermediate time t201 between the times t211 and t212, as illustrated by a range Z31. Then, the maximum value (the light reception level of the reflected light L2 from the target object 34) is detected by the arrival direction detecting unit 133 at a time t232 at which the time T1max has elapsed and which is illustrated in the range Z32.

Note that the time t211 and the time t212 in FIG. 12 are the same as the time t101 and the time t102 in FIG. 7, respectively.

On the other hand, after the second pulse light emission from a time t213 to a time t214 in the pulse light (second operation M2-2) emitted $2/60$ second later, the light reception level detected by the arrival direction detecting unit 133 is gradually attenuated by the fog 33 from a first light reception time t235 with reference to an intermediate time t204 between the times t213 and t214, as illustrated by a range Z33. Then, the maximum value (the light reception level of the reflected light L2 from the target object 34) is detected by the arrival direction detecting unit 133 at a time t215 at which the time T2max has elapsed and which is illustrated by a range Z34. Note that the time t213 and the time t214 in FIG. 12 are the same as the time t103 and the time t104 in FIG. 7, respectively.

The time difference between the first pulse light emission from the laser pointer 72 for detecting the time T1max and the second pulse light emission from the laser pointer 72 for detecting the time T2max is $2/60$ second. Accordingly, the light of the second pulse light emission reflected from the target object 34 is delayed by $(2/60)-\{(V \times 2/60)c\}$ seconds from the light of the first pulse light emission reflected from the target object 34.

When the possible maximum error is $\Delta T1$ (which is the same error value $\Delta T1$ as the error in the second operation M2-1, but of course different values may be set between the second operation M2-1 and the second operation M2-2), the time T2max can be obtained by detecting a time at which the light amount becomes the maximum value within a time range Tz of $\pm\Delta T1$ centered at the time $(2/60)-\{(V \times 2/60)/c\}$, from the time detected by the maximum light amount detecting unit 134 in the second operation M2-1, as illustrated in FIG. 12.

As described above, not the reflection from the fog 33 but the reflected light L2 from the target object 34 can be detected by detecting the maximum value (the time t215 at which the time T2max has elapsed since the time t204 at which the second pulse light is emitted, in FIG. 12) within the specific time range Tz (here, between the time $(2/60)-\{(V \times 2/60)/c\}-\Delta T1$ and the time $(2/60)-\{(V \times 2/60)/c\}+\Delta T1$ with reference to the last time at which the maximum value is detected).

That is, the maximum value between the time $(2/60)-\{(V \times 2/60)/c\}-\Delta T1$ and the time $(2/60)-\{(V \times 2/60)/c\}+\Delta T1$ is detected, with reference to the last time when the maximum value is detected by the maximum light amount detecting unit 134. Then, by knowing from the direction detecting unit 135 the arrival direction at the time when the maximum value is detected this time, the arrival direction instructing unit 136 can instruct the flying object 35 to proceed in the direction of the target object 34.

<Flight Control Process>

Figure 13:
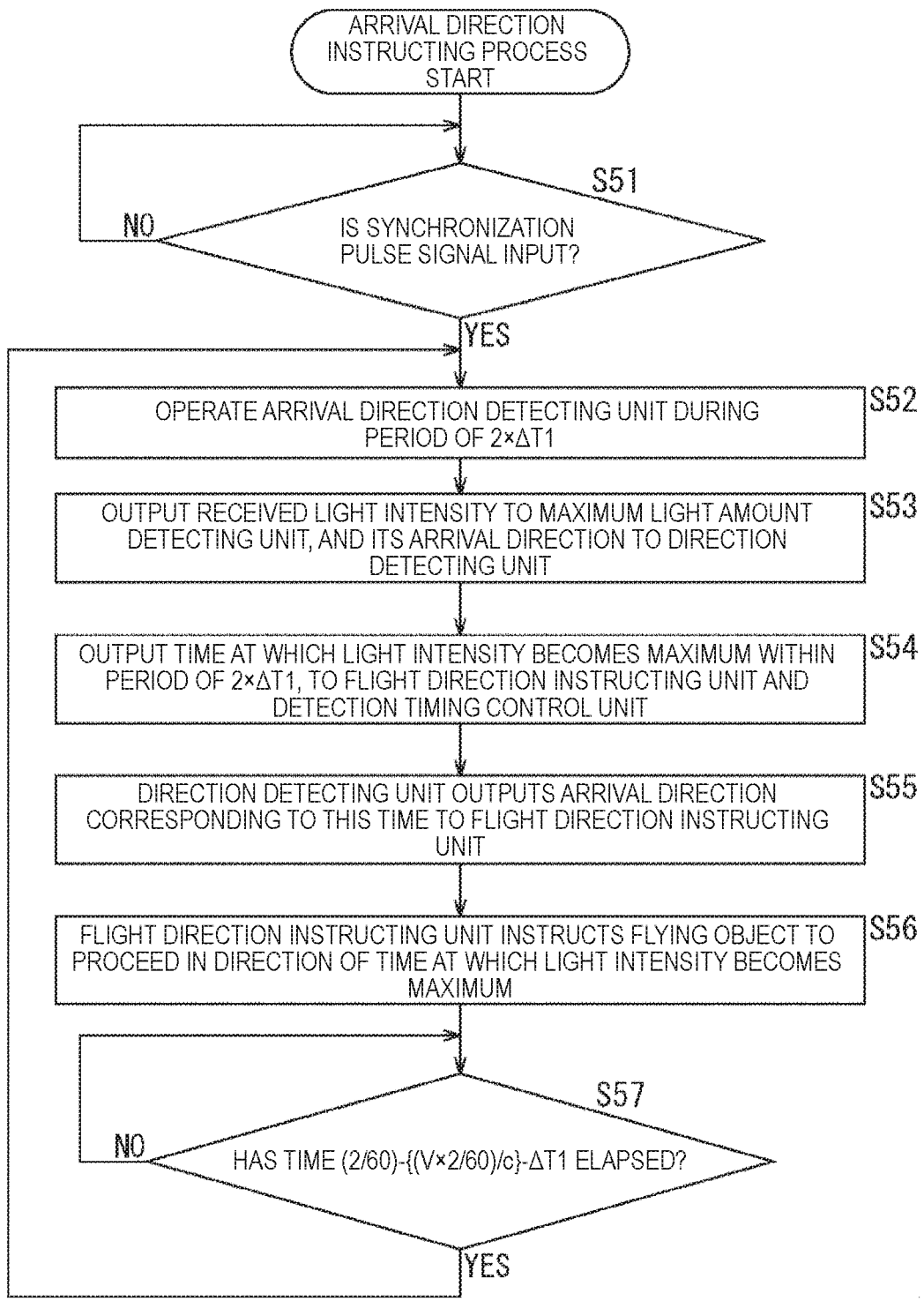
FIG. 13 is a flowchart for describing a flight control process.

Next, a flight control process will be described with reference to the flowchart of FIG. 13.

In step S51, the detection timing control unit 131 determines whether or not the synchronization pulse signal is supplied from the guidance control device 32 via the synchronization timing input terminal 111, and repeats a similar process until the synchronization pulse signal is supplied.

Then, if the synchronization pulse signal is supplied in step S51, the process proceeds to step S52.

In step S52, the detection timing control unit 131 controls the arrival direction detecting unit 133 to detect the arrival direction during the period of time $2 \times \Delta T1$.

In step S53, during the period of time $2 \times \Delta T1$, the arrival direction detecting unit 133 supplies information regarding the received light intensity to the maximum light amount detecting unit 134, and supplies information regarding the arrival direction to the direction detecting unit 135.

In step S54, the maximum light amount detecting unit 134 supplies the time of the maximum light intensity to the arrival direction instructing unit 136 and the detection timing control unit 131.

In step S55, the arrival direction instructing unit 136 recognizes the information regarding the arrival direction corresponding to the time supplied from the maximum light amount detecting unit 134, from the information regarding the arrival direction which is supplied from the direction detecting unit 135.

In step S56, the arrival direction instructing unit 136 supplies an instruction to cause the flying object 35 to fly in the recognized arrival direction, and controls the flight of the flying object 35.

In step S57, the detection timing control unit 131 determines whether or not the time $(2/60)-\{(V \times 2/60)/c\}-\Delta T1$ has elapsed from the time of the maximum light intensity, and repeats a similar process until the time is determined to be elapsed. Here, the speed V is calculated by the speed calculation unit 132, and is supplied to the detection timing control unit 131.

Then, in a case where the time $(2/60)-\{(V \times 2/60)/c\}-\Delta T1$ has elapsed from the time of the maximum light intensity in step S57, the process returns to step S52, and the subsequent processes are repeated.

By the above process, the operator can visually and clearly recognize the target object to which the laser pointer is projected, even in the fog, by alternately performing the direction of the gated imaging and the projection direction of the laser pointer at predetermined time intervals.

In addition, it is possible to know the approximate time from the first light emission of the laser pointer to reflection by the target object and reaching the arrival direction detecting device, from the imaging distance designated in the gated imaging. Further, the arrival direction detecting device can distinguish the reflection from the target object from the reflection from the fog, and detect the reflection from the target object, by detecting the maximum value of the light intensity around the time.

Furthermore, it is possible to know the approximate time from the second or subsequent light emission of the laser pointer to the reflection by the target object and reaching the arrival direction detecting device, in consideration of the speed of the arrival direction detecting device itself. Thus, the arrival direction detecting device can distinguish the reflection from the target object from the reflection from the fog, and detect the reflection from the target object, by detecting the maximum value of the light intensity around the time.

Although in the above an example in which the flying object is guided to the yacht of the target object has been described, an object other than the flying object may be guided to a target object other than the yacht, and for example a ship, a vehicle, or the like may be guided to a target object existing on the ocean or land.

Example of Execution by Software

Incidentally, the above series of processes can, for example, be executed by hardware, or can be executed by software. In the case where the series of processes is executed by software, a program configuring this software is installed in a computer included in dedicated hardware, or a general-purpose personal computer, for example, which can execute various functions when various programs are installed, etc., from a recording medium.

Figure 14:
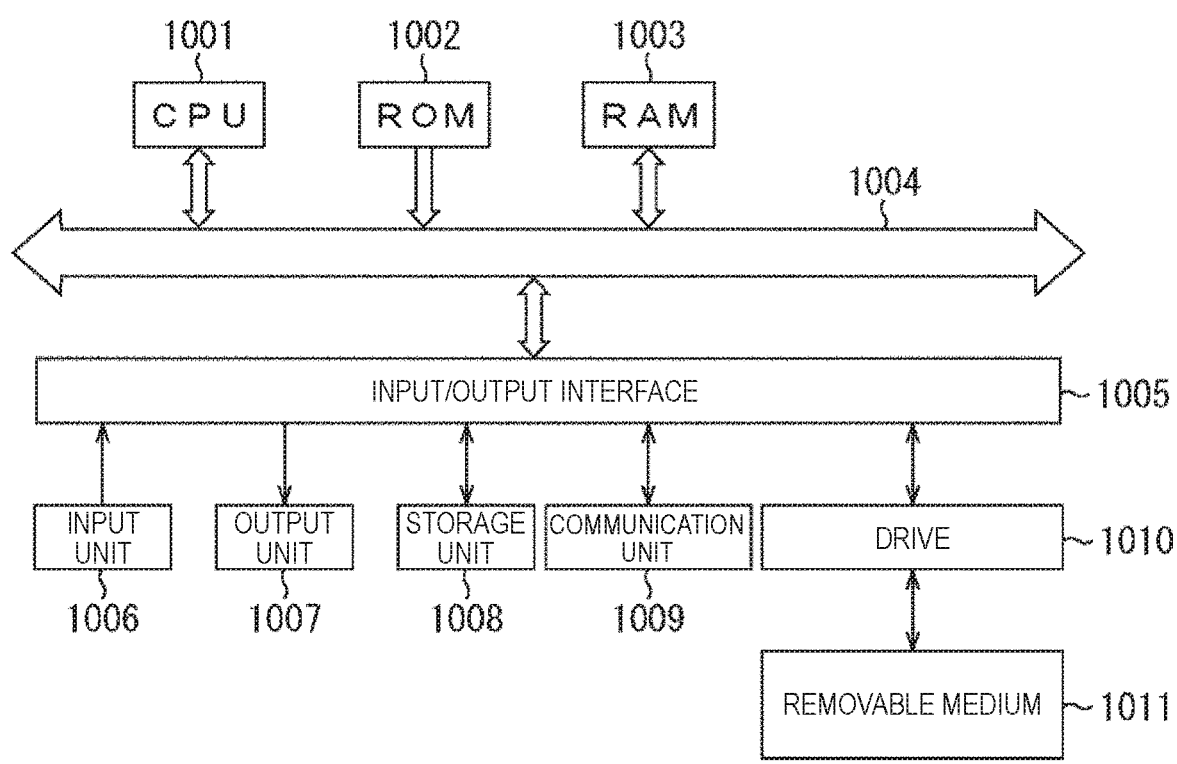
FIG. 14 is a diagram for describing a configuration example of a general-purpose personal computer.

FIG. 14 shows an example configuration of a general-purpose personal computer. The personal computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a LAN (Local Area Network) adaptor etc. which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a CD-ROM (Compact Disc-Read Only Memory) and a DVD (Digital Versatile Disc)), an magneto-optical disk (including an MD (Mini Disc)), or a semiconductor memory.

The CPU 1001 executes various processes according to a program stored in the ROM 1002 or a program which is read from the removable medium 1011, such as a magnetic disk, an optical disk, a magneto-optical disk, or a semiconductor memory, is installed in the storage unit 1008, and is loaded from the storage unit 1008 to the RAM 1003. The RAM 1003 also stores data which is necessary when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) can be, for example, provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in this specification, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a single apparatus including a plurality of modules within a single casing.

Note that an embodiment of the present disclosure is not limited to the embodiments described above, and various changes and modifications may be made without departing from the scope of the present disclosure.

For example, the present disclosure can adopt a configuration of cloud computing in which one function is shared and processed jointly by a plurality of apparatuses through a network.

Further, each step described by the above-mentioned flow charts can be executed by one apparatus or shared and executed by a plurality of apparatuses.

In addition, in the case where a plurality of processes are included in one step, the plurality of processes included in this one step can be executed by one apparatus or shared and executed by a plurality of apparatuses.

Additionally, the present technology may also be configured as below.

<1>

An information processing apparatus that indicates a direction that the information processing apparatus pays attention to, with a spotlight, including:

a gated imaging unit configured to capture a gated image; and a spotlight projecting unit configured to project the spotlight, in which the spotlight projecting unit projects the spotlight in a same direction as an image capturing direction of the gated imaging unit.

<2>

The information processing apparatus according to <1>, in which the gated imaging unit intermittently captures the gated image during a first period, the spotlight projecting unit intermittently projects the spotlight during a second period that is different from the first period, and the first period and the second period are repeated alternately.

<3>

The information processing apparatus according to <1> or <2>, in which the spotlight projecting unit projects the spotlight by emitting pulse light at predetermined intervals.

<4>

The information processing apparatus according to any one of <1> to <3>, further including:

an input unit configured to input a distance to a target object; and a display unit configured to display an image captured by the gated imaging unit, in which the direction for projecting the spotlight of the spotlight projecting unit is settable to a predetermined direction by a user, and in a case where the predetermined direction and the distance are identical with a direction and a distance in which the target object exists, the gated imaging unit captures the gated image of the target object, and the imaged target object is displayed on the display unit as the gated image.

<5>

The information processing apparatus according to <4>, in which when the predetermined direction and the distance are identical with a direction and a distance in which a predetermined target object exists, and the target object is displayed on the display unit as the gated image, the spotlight projecting unit projects the spotlight to the target object that exists in the same direction as the image capturing direction of the gated imaging unit.

<6>

An information processing method of an information processing apparatus that indicates a direction that the information processing apparatus pays attention to, with a spotlight, the information processing method including steps of:

capturing a gated image; and projecting the spotlight, in which the spotlight is projected in a same direction as an image capturing direction of the gated image.

<7>

An information processing apparatus that detects a direction that another information processing apparatus pays attention to, including:

an arriving light detecting unit configured to detect a light amount of reflected light when a spotlight that the other information processing apparatus projects in the direction that the other information processing apparatus pays attention to is reflected by a target object, together with a time; and a maximum value detecting unit configured to detect a maximum value of the light amount detected by the arriving light detecting unit, together with a time, within a predetermined period.

<8>

The information processing apparatus according to <7>, in which the arriving light detecting unit further detects an arrival direction of the reflected light, and the information processing apparatus further includes a direction detecting unit configured to detect the direction that the other information processing apparatus pays attention to, by specifying the arrival direction of the reflected light on a basis of a time at which the light amount of the reflected light is a maximum value.

<9>

The information processing apparatus according to <7> or <8>, in which the predetermined period is designated by the other information processing apparatus.

<10>

The information processing apparatus according to any one of <7> to <9>, in which the maximum value detecting unit repeats, a plurality of times, a process of detecting the maximum value of the light amount detected by the arriving light detecting unit together with the time, during each predetermined period.

<11>

The information processing apparatus according to <10>, in which the predetermined period is a period during which the arriving light detecting unit is able to receive the reflected light set on a basis of a distance from an own position to the target object.

<12>

The information processing apparatus according to <10>, in which the predetermined period is a period during which the arriving light detecting unit is able to receive the reflected light set on a basis of a distance obtained by subtracting an own moving distance from a distance from the own position to the target object.

<13>

The information processing apparatus according to <8>, further including:

a flying object whose flight is controlled by the direction detecting unit, in which the direction detecting unit controls the flying object to fly in a direction of the target object that the other information processing apparatus pays attention to.

<14>

An information processing method of an information processing apparatus that detects a direction that another information processing apparatus pays attention to, the information processing method including steps of:

detecting a light amount of reflected light, from a predetermined target object, of light that the other information processing apparatus projects in the direction that the other information processing apparatus pays attention to, together with a time; and detecting a maximum value of the detected light amount together with a time, within a predetermined period.

REFERENCE SIGNS LIST 11 gated imaging device
21 light emitting unit
22 image sensor
31 operator
32 guidance control device
33 fog
34 target object
35 flying object
41 arrival direction detecting device
51 quay wall
52 sea
71 control unit
72 laser pointer
73 gated imaging unit
74 monitor
75 input unit
76 synchronization timing output terminal
81 light emitting unit
82 image sensor
91 support column
92 wire
111 synchronization timing input terminal
112 arrival direction instruction output terminal
131 detection timing control unit
132 speed calculation unit
133 arrival direction detecting unit
134 maximum light amount detecting unit
135 direction detecting unit
136 arrival direction instructing unit

The invention claimed is:

1. A first information processing apparatus, comprising:
circuitry configured to:
detect a light amount, of reflected light from a target object, based on reflection of a spotlight by the target object, wherein the spotlight is projected by a second information processing apparatus in a first direction;
detect a maximum value of the light amount;
detect a time at which the light amount of the reflected light has the maximum value,
wherein the maximum value of the light amount is detected within a specific period;

detect an arrival direction of the reflected light based on the time at which the light amount of the reflected light has the maximum value;

detect a second direction of the target object based on the detected arrival direction of the reflected light; and control a flight of a flying object in the detected second direction of the target object.

2. The first information processing apparatus according to claim 1, wherein the specific period is designated by the second information processing apparatus.

3. The first information processing apparatus according to claim 1, wherein the circuitry is further configured to repeat a process of the detection of the maximum value of the light amount in each specific period.

4. The first information processing apparatus according to claim 3, wherein the specific period is a period in which the circuitry is further configured to receive the reflected light based on a distance from a position of the first information processing apparatus to the target object.

5. The first information processing apparatus according to claim 3, wherein the specific period is a period in which the circuitry is further configured to receive the reflected light based on a first distance, and the first distance is obtained by subtraction of a moving distance of the first information processing apparatus from a second distance between a position of the first information processing apparatus and the target object.

6. An information processing method, comprising:

detecting, by circuitry of an information processing apparatus, a light amount of reflected light from a target object, wherein the detection of the light amount is based on reflection of a spotlight by the target object, and the spotlight is projected by a second information processing apparatus in a first direction;

detecting, by the circuitry, a maximum value of the light amount, and a time at which the light amount of the reflected light has the maximum value, wherein the maximum value of the light amount is detected within a specific period;

detecting, by the circuitry, an arrival direction of the reflected light based on the time at which the light amount of the reflected light has the maximum value;

detecting, by the circuitry, a second direction of the target object based on the detected arrival direction of the reflected light; and controlling, by the circuitry, a flight of a flying object in the detected second direction of the target object.

* * * * *